No. 691,834. Patented Jan. 28, 1902.
J. E. WOODBRIDGE.
METHOD OF SYNCHRONIZING ALTERNATORS.
(Application filed July 30, 1900.)
(No Model.)
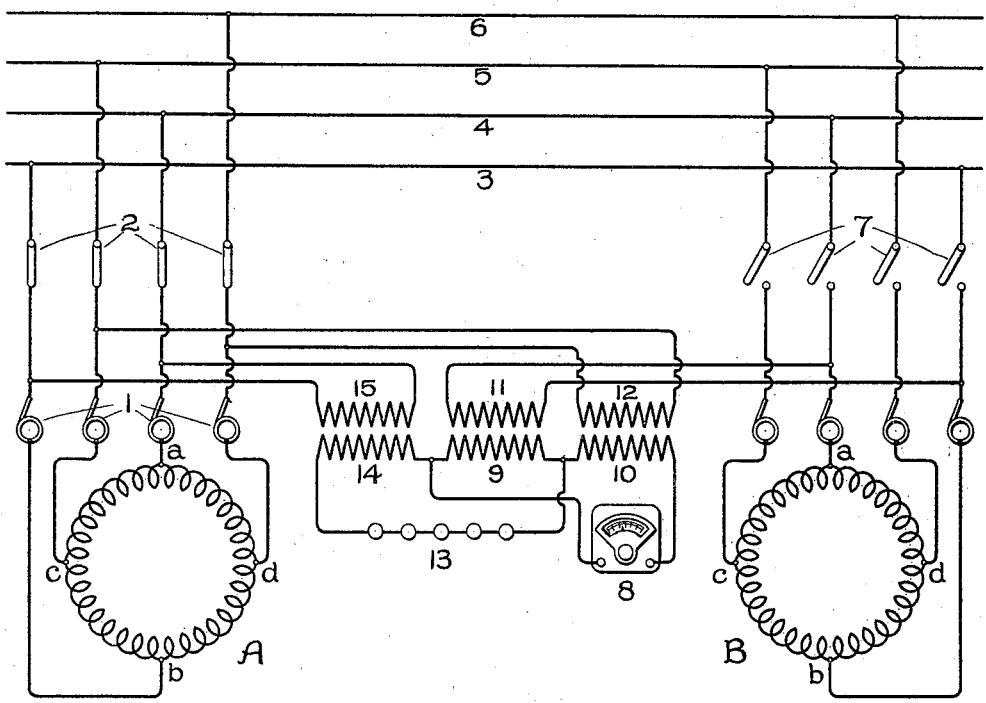
Witnesses:
Lewis F. Abell.
Benjamin B. Hull
Inventor:
Jonathan E. Woodbridge,
by Albert G. Davis
Atty.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

METHOD OF SYNCHRONIZING ALTERNATORS.

SPECIFICATION forming part of Letters Patent No. 691,834, dated January 28, 1902.

Application filed July 30, 1900. Serial No. 25,263. (No specimens.)

*To all whom it may concern:*

Be it known that I, JONATHAN E. WOODBRIDGE, a citizen of the United States, residing at Schenectady, county of Schenectady, State of New York, have invented certain new and useful Improvements in Methods of Synchronizing Alternators, (Case No. 1,796,) of which the following is a specification.

In practice two methods of synchronizing are commonly employed, one known as "synchronizing bright" and the other "synchronizing dark." In the first case electromotive forces derived from corresponding phases of the machines to be synchronized are connected so as to operate in conjunction with each other, whereby synchronism is indicated by the occurrence of maximum resultant electromotive force. In synchronizing dark the electromotive forces are connected in opposition to each other, in which case synchronism is indicated by the occurrence of minimum or zero electromotive force. Both of these methods are faulty. In synchronizing bright considerable variations of phase angle may occur between the component electromotive forces without appreciably altering the resultant, while in synchronizing dark the resultant voltages are very small and difficult to read, either on lamps or alternating-current voltmeters.

To overcome the objections above specified, I depart from the usual practice of combining electromotive forces derived from corresponding phases of the machines to be synchronized, and instead thereof I make use of electromotive forces which are out of phase with each other when the machines are in synchonism. Thus, for example, in synchronizing quarter-phase generators I may employ one of the phases of one of the machines in connection with the other phase on the other machine. At the instant of synchronism the resultant electromotive force due to the combination has a comparatively large value, which may be easily read by indicating instruments, and in addition is sensitive to even slight changes in the phase relation of the machine. The instant of synchronism may therefore be determined with much greater accuracy than is possible by the use of present methods.

The points of novelty of my invention will be set forth in the claims appended hereto, while the mode of operation of my invention will be better understood by reference to the following description, taken in connection with the accompanying drawing, which represents one of the various embodiments my invention may assume.

At A is indicated a quarter-phase generator, connected through collector-rings 1 and switches 2 to a set of quarter-phase mains 3 4 5 6. A similar machine B is adapted to be connected to the same quarter-phase mains by means of the set of switches 7, here shown in the open position. For the purpose of indicating synchronism I make use of two indicating devices, connected through synchronizing transformers with the mains of the machines to be synchronized. An alternating-current voltmeter is indicated at 8 and is connected in series with the secondaries 9 10 of two transformers, one of the primaries of which is connected across one phase of one of the machines and the other primary across the opposite phase of the other machine. Thus the primary 11, corresponding to the secondary 9, is connected across the phase $a\,b$ of the machine B, while the primary 12, corresponding to the secondary 10, is connected across the other phase $c\,d$ of the machine A. The electromotive force impressed upon the voltmeter 8 is therefore the resultant of two normally phase-displaced electromotive forces. This electromotive force varies above and below an intermediate value or seventy-one per cent. of the maximum deflection, representing a ninety-degree displacement, corresponding to a synchronism, and varies through a considerable range with even slight variations from this ninety-degree relation. The proper moment for synchronizing corresponds to this intermediate point in the swing of the voltmeter, and as the amplitude of the swing is considerable the moment of synchronism may be determined with precision.

In the use of the synchronizing device thus described no distinction is apparent from the voltmeter as to whether the machines are in conjunction with each other or in exact opposition, the readings of the voltmeter being the same in either case. To guard against throwing the machines together while in opposition, I make use of the ordinary phase-lamps to indicate whether the machines are in conjunction with each other. In the drawing these lamps are indicated at 13 and are connected in circuit across the series-connected secondaries of two transformers whose primaries are derived from the corresponding phases of the two machines to be synchronized. Thus I may make use of the secondary 9, whose primary 11 is connected across the phase $a\ b$ of the machine B, and an additional secondary 14, whose primary 15 is connected across the corresponding phase $a\ b$ of the machine A. The connections are preferably made so that the electromotive forces in the secondary circuit will operate in conjunction with each other when the respective machines are in synchronism—that is, so the lamps 13 will light up.

In observing the synchronism-indicating devices above described it will be evident from what has been said that the proper time to throw in the machine B is at the moment when the phase-lamps 13 are bright and the needle of the voltmeter 8 at the proper point in its swing.

If the electromotive force indicated on the voltmeter is less than the intermediate value indicating the proper phase relation of the machines, one machine, let us say A, is ahead of the other machine by a phase angle less than one-half of a period, while if the electromotive force is greater than this intermediate value machine A is behind machine B less than one-half of a period. If the synchronizing-lamps show that the machines approach their proper phase relation when machine A is behind machine B and recede from it when machine A is ahead of B, then A is running faster than B. Conversely, if A recedes from B when behind B and approaches B when ahead of it then A is running more slowly than B. This arrangement therefore gives a ready means of observing which machine is running the faster.

Although I have described above but a single embodiment of the broad principle underlying my invention, it will of course be evident that many other means may be devised for carrying out the same mode of operation without departing from the spirit of my invention, for which reason I do not wish to be limited to the specific arrangement shown.

What I claim as new, and desire to secure by Letters Patent of the United States, is—

1. The method of indicating synchronism of alternating-current machines, which consists in comparing an electromotive force derived inductively from one phase of one of the machines with an electromotive force derived inductively from a different phase of another machine.

2. The method of indicating synchronism of alternating-current machines which consists in acting upon an indicating device by electromotive forces derived inductively from said machines and normally out of phase with each other when said machines are in synchronism.

3. The method of indicating synchronism of alternating-current machines, which consists in acting upon an indicating instrument by two normally phase-displaced electromotive forces one of which is derived inductively from one of the machines and the other from another machine.

4. The method of indicating synchronism of alternating-current machines, which consists in combining an electromotive force derived inductively from one phase of one of the machines with an electromotive force derived inductively from a different phase of another machine and indicating variations in the resultant electromotive force.

In witness whereof I have hereunto set my hand this 27th day of July, 1900.

JONATHAN E. WOODBRIDGE.

Witnesses:
BENJAMIN B. HULL,
MABEL E. JACOBSON.